Figure 4:
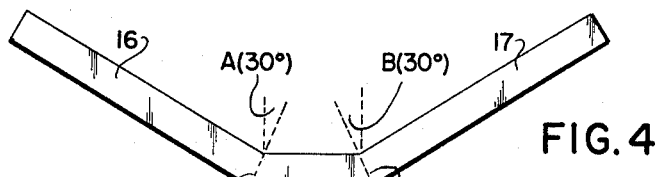

Nov. 29, 1960

H. NIEDERS 2,962,638

CLAMP FOR ELECTROLYTIC CAPACITOR

Filed Oct. 4, 1957

INVENTOR.
Harold Nieders

BY

*Nicholas Laupp*

ATTORNEY

United States Patent Office 2,962,638
Patented Nov. 29, 1960

2,962,638

CLAMP FOR ELECTROLYTIC CAPACITOR

Harold Nieders, Indianapolis, Ind., assignor to P. R. Mallory & Co., Inc., Indianapolis, Ind., a corporation of Indiana Filed Oct. 4, 1957, Ser. No. 688,174

7 Claims. (Cl. 317—230)

This invention relates to electrical capacitors and has specific applications to means and methods for mounting a wound unit in a surrounding case.

Various means have been used for mounting a wound capacitor unit or cartridge in its capacitor case. One method used a corrugated cardboard before insertion in the case. In another method the wound unit is inserted into the case and a molten solidifying material is poured into the case to hold the cartridge when the material cools. Another means comprised a longitudinal spring which had a considerable flat portion pressing against one side of the capacitor cartridge to position the same against its associated inner wall of the casing.

The present invention has advanced the art considerably over these prior expedients by providing a true clamping or mounting structure for a capacitor cartridge which is inserted into a cylindrical can. It provides a clamp fabricated of a single strip of metal and which is especially formed to provide dual spring tensioning arms coupled to an intermediate bottom central portion which is angulated with respect thereto. The clamp thus formed supports said capacitor cartridge in its case at two points 120° apart and by spring tension of the arched arm members will force the cartridge against the side of the case thereby giving the cartridge a three point support at any depth in the case.

The prime object of the present invention is to provide an improved mounting means for supporting a wound coil unit or cartridge in a capacitor case.

Still another object of the present invention is to provide an improved mechanical clamp to anchor electrolytic capacitor cartridges in their containers.

Yet another object of the present invention is to provide a mechanical anchor for mounting an electrical capacitor cartridge in its associated case so that it gives a true clamping hold thereupon.

Yet another object of the present invention is to provide a mounting clamp for predeterminedly maintaining a wound capacitor coil or unit in a cylindrical case whereby a three point suspension of the unit is maintained thereby, said suspension making provision for improved heat transfer characteristics between the unit and the wall of the metal container so as to dissipate the heat from inside the container in a rapid and efficient manner.

Still another object of the present invention is to provide means for mounting a cylindrical cartridge of wound layers of foil within a cylindrical casing, the position of said cartridge therein being as desired, and providing a firm support therefor by means of supporting the cartridge at points 120° apart.

Other objects of the invention will become apparent as the description proceeds and from the figures of the drawing; the scope thereof being defined by the appended claims.

Figure 1:
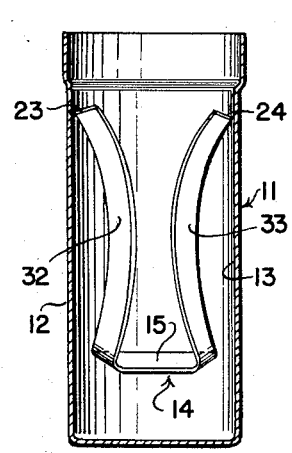

In order that the invention may be readily understood and the teachings thereof effectuated, an example will be described in detail with reference to the accompanying drawing in which Fig. 1 is a longitudinal section of a condenser can into which a cartridge is to be inserted, said can having inserted therein the clamping means for holding the cartridge.

Figure 2:
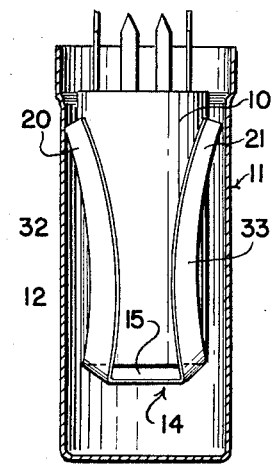

Fig. 2 is a longitudinal section of the condenser with the clamp therein illustrating the manner of support of the cartridge of the condenser as placed within the can and as being held in a three point suspension therein.

Figure 5:
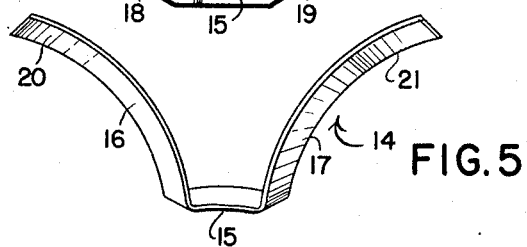
Figure 6:
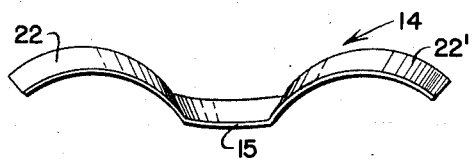
Figure 3:
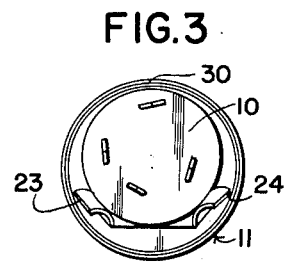

Fig. 3 is a top view of the casing as including the cartridge within the casing and as adapted to illustrate the mode of holding the cartridge within the spring arms of the clamping means, with said arms being spread to effect a three point contact with the inside wall of the casing, and Figs. 4, 5 and 6 are drawings depicting the clamping means used herein, with Figs. 4 and 5 illustrating the mode of forming the clamping means and Fig. 6 being a top view of the clamping spring depicting the arched and resilient construction thereof.

Generally speaking, according to the present invention, an electrolytic condenser has its wound cartridge mounted in its case in a three point suspension by means of a resilient spring clamp. The clamp provides a mechanical anchor which will exert a constant and uniform force upon the cartridge thereby effectively anchoring the cartridge coil in relation to its container so that vibration or mass forces acting upon the cartridge will have little effect thereon and will moreover prevent such forces from being transmitted to the associated electrical connectors. The spring clamp comprises a single length of spring steel which is constructed to form a pair of arms arched in a manner to provide optimum support of the cartridge at two spots 120° apart. The arms have a resilience characteristic such that the said arms will exert enough force to hold the cartridge against the container wall for a third anchoring point. Furthermore, the fact that the clamp holds the cartridge against the wall of the container is advantageous since this will allow better heat conduction to the outer surface of the container. This, of course, allows for improved efficiency and operation of the condenser since the heat from the cartridge may be dissipated more quickly through intimate wall contact and clamp arm conduction.

As stated, the clamp is formed of a single strip of metal, fabricated in a predetermined manner so that an intermediate section connects a pair of bowed arms, having a resilience characteristic determined through the use of stainless steel formed to full hard temper, having a maximum yield strength of around 200,000 p.s.i. (at 0.2% elongation) and has a maximum tensile strength of 250,000. The characteristics of the spring have been taken to give the necessary spring temper qualities and is fabricated of material which will not cause corrosion when assembled internally in an electrolytic capacitor. The stainless steel material is optimum for giving the desired resilience and clamping characteristics as well as providing for efficient heat dissipation. It is to be noted further that the spring clamp when formed is able to take care of variations in unit diameters of from one-half the container diameter and above.

Now, referring more specifically to the figures of the drawing, there is shown (Figs. 2 and 3) a wound foil unit 10 of an electrolytic condenser as arranged in a cylindrical metal case 11. The case 11 comprises an annular side wall 12 having an inside surface 13 against which the cartridge or wound unit 10 will be supported at any predetermined depth by means of clamp or sling 14 as hereinafter described. The clamp 14 comprises a unitarily formed spring of stainless steel having a central portion 15 interconnected by a pair of arms 16, 17.

In forming the clamp the arms are bent along bend lines 18 and 19 of Fig. 4 to form angles A and B with respect to the central portion 15. This angle has been determined as being 30°. After being so bent the individual arms are next bowed to take on the configuration as shown in Figs. 5 and 6. The free ends 20, 21 thereof are flared outwardly giving arcs 22, 22' having termini which will allow the clamp to spring out and make contact with the inner surface 13 of the case at points 23 and 24 thereof as shown in Fig. 1. It is to be seen from Figs. 2 and 3 that when the cartridge is inserted into the case and into the clamp it spreads the arms of the clamp in a fashion that a portion of each arm 32, 33 will lie against the cartridge along the bowed or arched portion thereof with the ends 20 and 21 making contact with the inner wall of the case at points 22, 23, approximately 120° apart from each other. The clamp 14, as its arms are spread, will force the cartridge to make contact at a third point 20 of the casing, giving a three point suspension to the entire unit (Fig. 3).

It is apparent that the clamp will be adapted to hold many sizes of coil units and will also provide a means to hold the same at predetermined depths in the container. In the construction of the clamp, heat generated in the cartridge will be quickly directed to the outside of the casing so as to provide means for efficiently dissipating the same. The clamp carries the cartridge in a manner of a sling. The resilience characteristics and the forming of the stainless steel clamp create a firm mounting of the coil unit within the cartridge case so as to be stable under extreme conditions of vibration and handling. Further, the clamp has been constructed so that in its manufacture, a continuous strip of material may be utilized and formed in a progressive forming die. Thus, there is provided a simple, economic and yet a greatly improved capacitor cartridge mounting obviating the need of cumbersome and hazardous mounting procedures.

What is claimed is:

1. In an electrolytic capacitor including a cylindrical metallic casing, a coil positioned therein, a clamp for positioning and holding said coil in a tight manner therein, said clamp comprising a unitary spring member, said member having a middle portion and two arms bent upwardly therefrom, said arms being curved, said coil being retained therein by having portions of the two arms abutting said coil, said arms having free ends making contact with the side wall of said casing, said coil spreading said arms and being forced against said casing at a third point to form a three point suspension mount for said coil.

2. In an electrolytic capacitor including a tubular cylindrical metallic casing, a wound foil unit positioned therein along the longitudinal axis of said casing, a clamp for positioning and holding said unit therein comprising a unitarily formed spring member having a pair of arms, said arms connected to a horizontal bottom section, said arms gripping said unit at substantially distant points therein, the arms being spread thereby to make contact with the inner side wall of said casing at the free end of each arm, said cartridge being also forced thereby against said wall of said container to form a three point suspension for said cartridge.

3. In an electrolytic capacitor including a cylindrical metallic casing, a capacitor cartridge positioned therein, a clamp for positioning and holding said unit therein comprising a single strip of metal bent to have two long arms interconnected by a middle portion, said arms being substantially vertically positioned with respect to said latter portion, said cartridge being held at two determined points within said arms, said arms being spread so that an end of each arm makes contact with the side wall of said casing, said cartridge being forced against said casing whereby a three point suspension is afforded to hold said cartridge firmly within said casing.

4. In an electrolytic capacitor including a tubular cylindrical metallic casing, a wound foil unit positioned within said casing, a U-shaped clamp for holding said unit within said casing comprising a pair of arms connected by a center portion, said arms extending axially along said unit to grip the same at two discrete circumferential points, said unit spreading said arms so that the free ends thereof make contact with the inner side wall surface of said casing, said unit being forced thereby against said casing at a third point to form a three point suspension mount for said wound foil unit.

5. In an electrolytic capacitor including a tubular metallic casing, a wound foil unit positioned axially within said casing, a clamp for holding said unit within said casing comprising a single strip of metal having a pair of arms connected to a bottom central portion, said arms extending axially along said foil unit to grip the same at two discrete circumferential points, said unit spreading said arms so that the free ends thereof make contact with the inner side wall surface of said casing, said unit being forced thereby against said casing at a third point to form a three point suspension mount for said wound foil unit.

6. In an electrolytic capacitor including a tubular metallic casing, a wound foil unit positioned axially with the long side of said casing, a clamp for holding said unit within said casing comprising a pair of bowed arms integrally connected to a bottom central portion, said arms extending axially along said unit to grip the same at two discrete circumferential points, said bottom portion being in a plane parallel to said bottom of said casing, said unit spreading said arms so that the free ends thereof make contact with the inner side wall surface of said casing; said unit being forced thereby against said casing at a third point to form a three point suspension mount for said wound foil unit.

7. In an electrolytic capacitor including a tubular metallic casing, a wound foil unit positioned axially within said casing, a clamp formed of a single strip of stainless steel for holding said unit within said casing comprising a pair of bowed arms integrally connected to a bottom portion and angulated with respect thereto, said arms extending axially along said unit to grip the same at two discrete circumferential points, said unit spreading said arms so that the free ends thereof make contact with said inner side wall surface of said casing; said unit being forced thereby against said casing at a third point to form a three point suspension mount for said wound foil unit.

References Cited in the file of this patent

UNITED STATES PATENTS

| 534,906 | McLean | Feb. 26, 1895 |
| 1,447,716 | Flansburg | Mar. 6, 1923 |
| 2,609,426 | Bugel | Sept. 2, 1952 |

FOREIGN PATENTS

| 134,768 | Switzerland | Oct. 16, 1929 |